US006405125B1

United States Patent
Ayed

(10) Patent No.: US 6,405,125 B1
(45) Date of Patent: Jun. 11, 2002

(54) PARKED VEHICLE LOCATOR

(76) Inventor: Mourad Ben Ayed, 107 Quebec Ave #3, Toronto (CA), M6P 2T3

( * ) Notice: Subject to any disclaimer, the term of this patent is extended or adjusted under 35 U.S.C. 154(b) by 0 days.

(21) Appl. No.: 09/669,338

(22) Filed: Sep. 26, 2000

(51) Int. Cl.[7] .......................... G08G 1/123; G01C 21/00
(52) U.S. Cl. ............................ 701/200; 701/1; 701/207
(58) Field of Search ............................ 701/1, 213, 214, 701/300, 207, 200; 342/357.07, 357.08, 357.09, 357.13; 340/989

(56) References Cited

U.S. PATENT DOCUMENTS

| 4,476,469 A | | 10/1984 | Lander .................. 340/825.49 |
| 4,797,671 A | * | 1/1989 | Toal, Jr. ................ 340/825.49 |
| 4,964,360 A | | 10/1990 | Henry ........................ 116/173 |
| 5,146,231 A | | 9/1992 | Ghaem ........................ 342/419 |
| 5,173,709 A | | 12/1992 | Lauzo et al. ................ 342/443 |
| 5,388,546 A | | 2/1995 | Lombard ..................... 116/209 |
| 5,777,580 A | | 7/1998 | Janky et al. ................ 342/457 |
| 6,163,278 A | * | 12/2000 | Janman ....................... 340/988 |
| 6,249,233 B1 | * | 6/2001 | Rosenberg et al. ...... 340/932.2 |

FOREIGN PATENT DOCUMENTS

| JP | 6-84092 | | 3/1994 |
| JP | 11229680 A | | 2/1998 |
| JP | 11-304509 | * | 11/1999 |

OTHER PUBLICATIONS

U.S. application No. 09/325,872 filed Jun. 4, 1999, Ayed, pending.

* cited by examiner

Primary Examiner—Michael J. Zanelli

(57) ABSTRACT

Parking lots are divided into sections, and each section is equipped with a transmitter. Each transmitter broadcasts information about the location of the section, such as section identifier, level, parking lot address, parking lot GPS coordinates. Vehicles are equipped with small short-range transmitters. A transmitter senses the interior light turning on as the vehicle door opens, and transmits a short-range signal. Vehicle owners are provided with locator devices. When a vehicle is parked, the locator device receives a signal from the vehicle sensor. The locator then listens to the nearest parking lot transmitter and stores the message it receives. If the locator does not find any parking lot transmitter, the locator may determine the current GPS location and store it in memory. Upon receiving a user request for finding a parked vehicle, the locator looks at the last message stored in memory and displays the location message to the user. This message helps the user return to the parked vehicle. The locator may determine the user's current GPS location and compass direction, and display a pointer and distance to the parked vehicle location. The locator remains dormant until it senses the trigger event or until a user requests the location of the parked vehicle. As such, the functionality of the present invention is unobtrusive yet convenient.

28 Claims, 10 Drawing Sheets

Fig. 5B – part 1
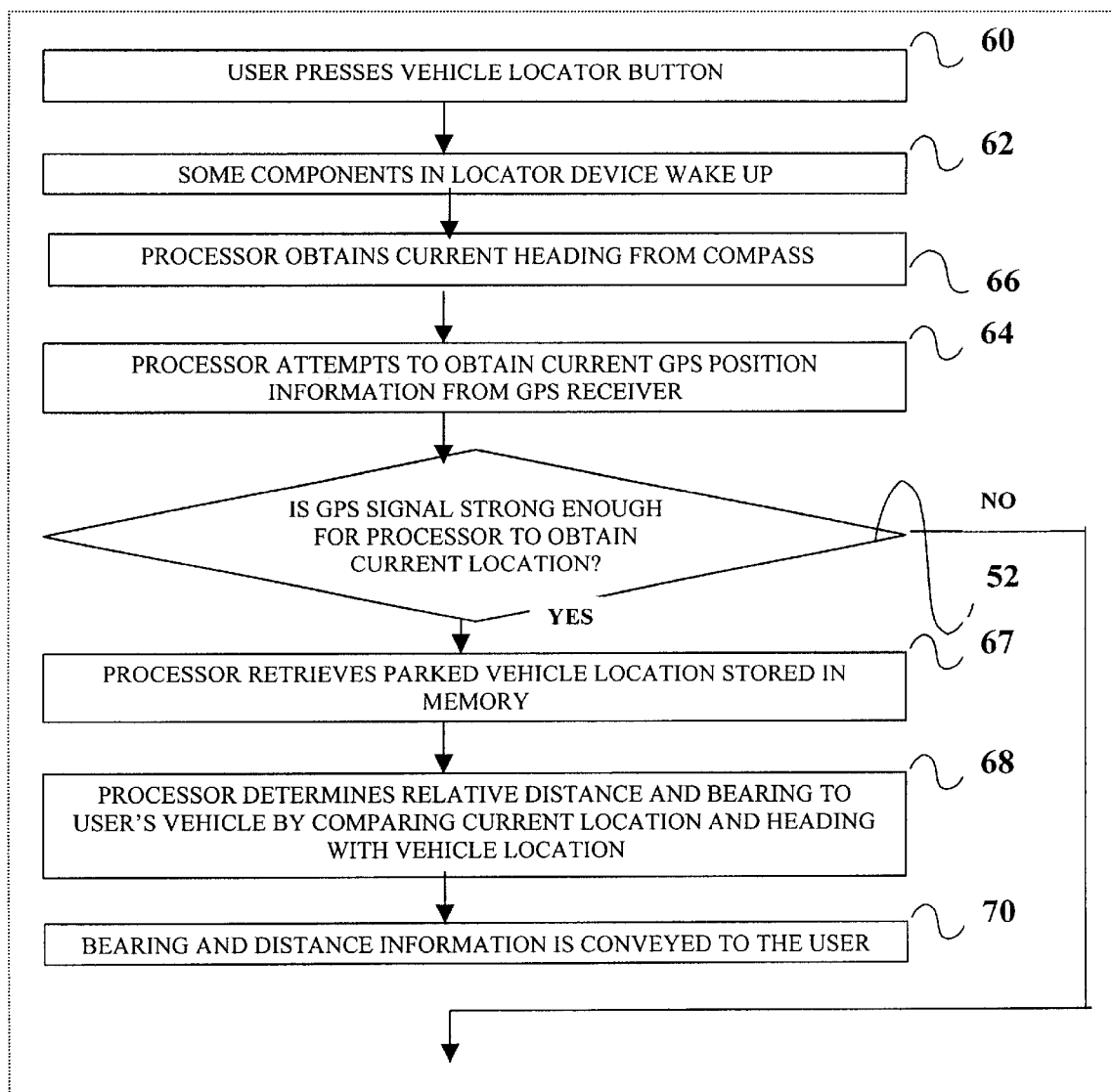

Fig. 5B- part 2
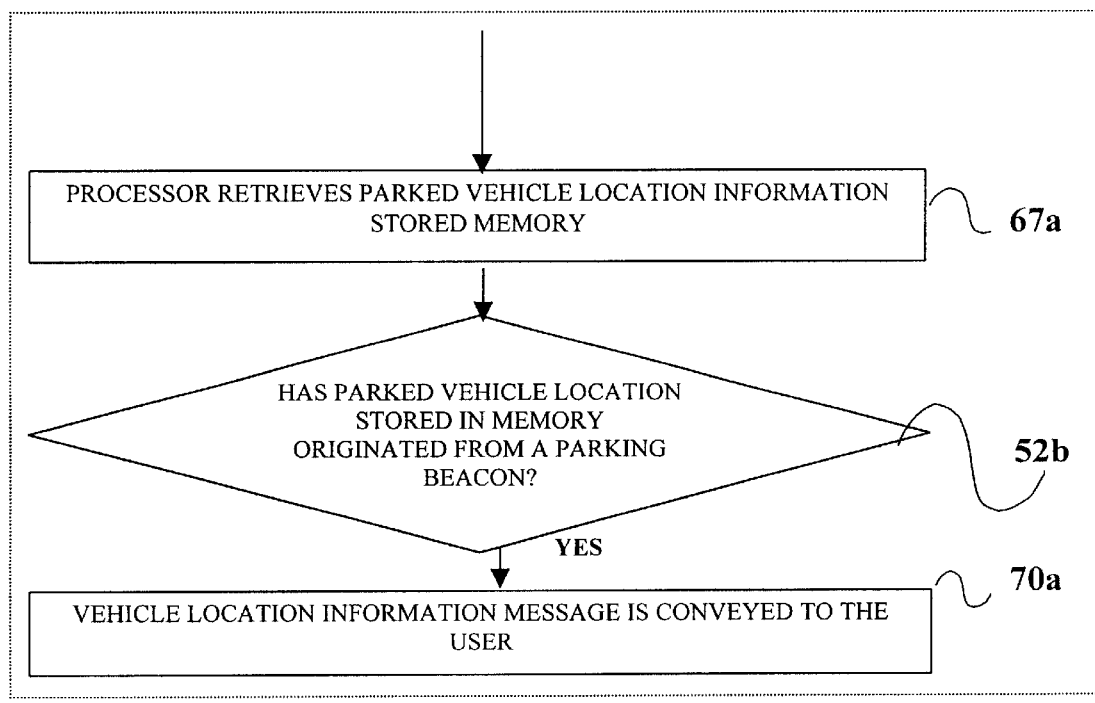

PARKED VEHICLE LOCATOR

FIELD OF THE INVENTION

This invention is directed to the field of appliances and more specifically, electronic vehicle finders whereby a vehicle's location is automatically stored upon sensing of a trigger event.

BACKGROUND OF THE INVENTION

Conventional devices for locating parked vehicles use visual attention devices such as flags, banners, pennants or streamers, which are supported from an antenna, as disclosed in U.S. Pat. No. 4,964,360 ("Henry"), or masts with magnetic bases for attaching to vehicle roofs, as disclosed in U.S. Pat. No. 5,388,546 ("Lombard"). However, these systems are not effective at long distances or in bad weather conditions.

Other devices use electronic communication techniques to locate vehicles. U.S. Pat. No. 5,777,580 ("Janky, et. Al."), discloses a mobile vehicle location system comprising a location determination system, such as the Global Positioning System ("GPS"), in combination with a transceiver/receiver. In Janky, et al. the vehicle location system resides with the target vehicle. While the vehicle location may be determined by remotely communicating with the location system, the user's location cannot be known with the same device when the user is outside the vehicle. Accordingly, Janky et. Al is unable to determine the relative position of the vehicle to the user.

Known location determination devices cooperate with location systems such as GPS, Global Navigation System ("GLONASS"), Global Navigation Satellite System ("GNSS") or Long Range Navigation ("LORAN") to provide a user with the latitude and longitude of a location. These devices might be used to direct a user back to a desired location, like the location of a parked vehicle. For instance, if the latitude and longitude of a parked vehicle were input to the navigation instrument, the instrument could readily calculate the distance and bearing to the vehicle. A disadvantage with using this device for locating a parked vehicle is that the user must know or be able to determine the coordinates of a vehicle and must input these coordinates into the locator device every time the location of the vehicle changes.

Japanese patent application number 4237091 by Nissan Motor Co. Ltd., describes a system that is composed of a GPS receiver wired to a vehicle's key. The system records the vehicle GPS position every time the key is removed from the vehicle's ignition. If the user asks for directions to its parked vehicle, the system determines the current GPS position and the current heading. It then calculates and displays a pointer to the parked vehicle location. This system requires a specially designed key and does not function reliably in indoor parking lots.

Japanese patent application number 10051542 by Mazda Motor Co. Ltd., describes a system that is composed of a GPS receiver wired to a vehicle's remote locking system. The system records the vehicle GPS position every time the remote locking button is activated. If the user asks for directions to its parked vehicle, the system determines the current GPS position and the current heading. It then calculates and displays a pointer to the parked vehicle location. This system requires a specially designed remote-locking device integrated with a GPS receiver, compass and a display device. The system does not function reliably in indoor parking lots.

The current invention is an extension to pending U.S. patent application Ser. No. 09/325872 by Mourad Ben Ayed. The latter describes a two-part system based on GPS that allows a user to return to a parked vehicle. The first system is composed of a sensor and a transmitter installed in the vehicle. The sensor detects events of the user leaving the vehicle and the transmitter sends a wireless signal indicating that event. The second system is a hand-held locator which after receiving the wireless signal from the vehicle transmitter, determines and stores the current GPS location for future use. The current location is a close match to the location of the parked vehicle. If the user asks for directions to its parked vehicle, the locator determines the current GPS position and the current heading. It then calculates and displays a pointer to the parked vehicle location. This system requires the use of GPS. It works well for vehicles parked on the street or in outdoor parking lots, but does not function reliably in indoor parking lots.

The previous systems present a number of disadvantages:

They are not reliable: none of the systems can work reliably with vehicles parked in outdoors and indoors parking lots as well as on street parking.

The GPS based systems depend on other hardware, namely, remote control, or key equipped with special wiring, and cannot be sold as stand-alone.

Thus there is a need for a more convenient and reliable method and apparatus for locating a user's parked vehicle that works in indoors and outdoors parking lots.

SUMMARY OF INVENTION

A method for facilitating returning to a parked vehicle location, comprising responsive to receiving a wireless activation signal, detecting the presence of a wireless transmitter; obtaining location data from said wireless transmitter; and storing said location data.

Apparatus for facilitating finding a parked vehicle, comprising the followings:

A signaler arranged for signaling to indicate a vehicle has been parked;

Many transmitters each transmitting location data about its location.

A locator responsive to said signaler for detecting nearest transmitter, obtaining location data from that nearest transmitter, and storing that location data in memory upon receiving a signal from said signaler.

A method for facilitating returning to a parked vehicle location, comprising, partitioning a parking lot in sections, putting a transmitter in each section, each transmitter broadcasts directions for returning to said section over the area of said section.

BRIEF DESCRIPTION OF THE DRAWINGS

The present invention will be more clearly understood after reference to the following detailed specifications read in conjunction with the drawings wherein:

FIG. 5B is a flowchart illustrating alternative steps involved in conveying parked vehicle location information to a user;

Similar reference numerals are used in different figures to denote similar components.

DETAILED DESCRIPTION OF THE PREFERRED EMBODIMENTS

Figure 1A:
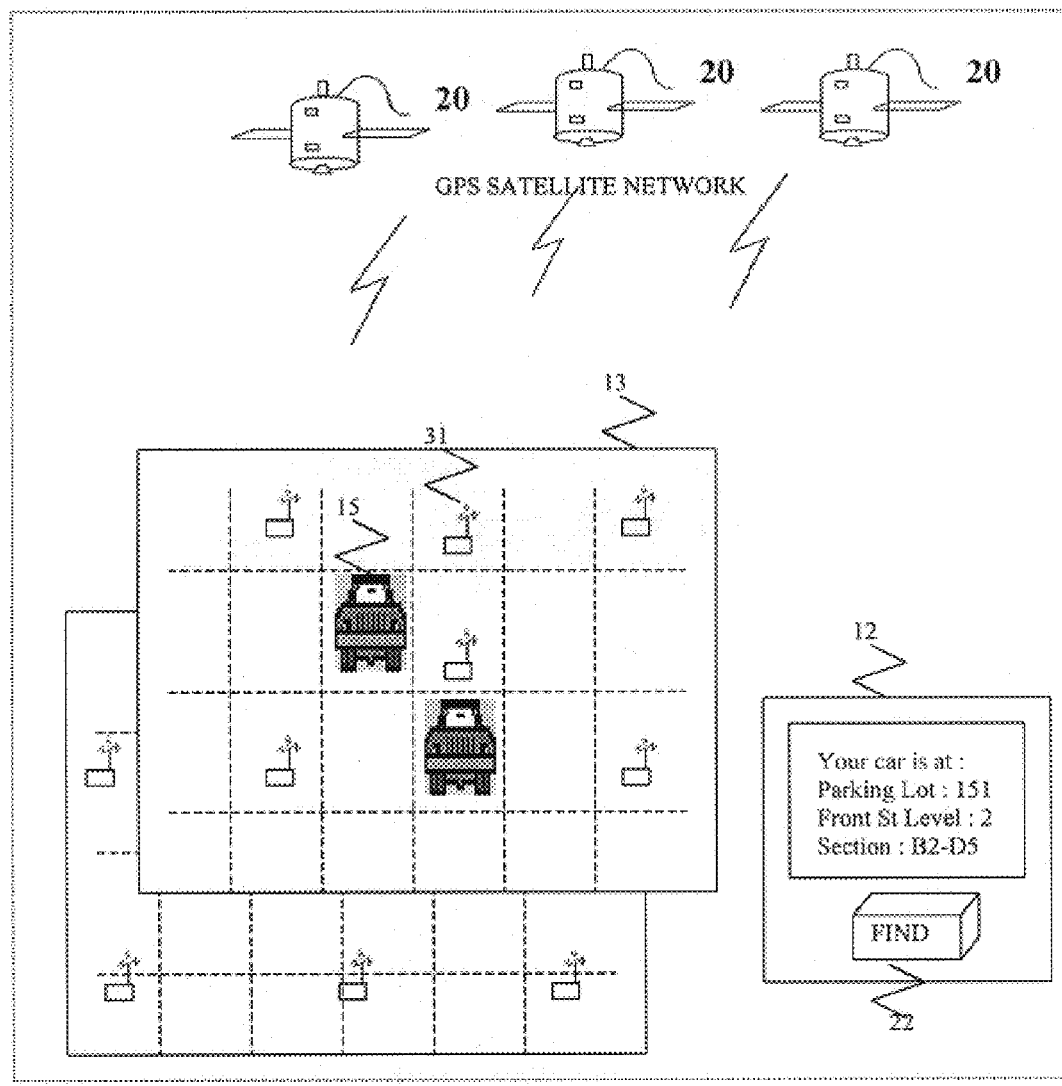
FIG. 1A is a schematic of a parked vehicle locator system.

FIG. 1A is schematic of a parking lot 13 equipped with parking location beacons 31. The parking lot is partitioned in sections of predefined size (e.g. 20 meters×20 meters). A beacon 31 is positioned in each of the sections and is programmed to continuously broadcast information about the section (e.g. Level 15, Section B05-C11) and the parking lot (name, address, GPS coordinates) over the area of the parking lot section. Beacons from different sections broadcast different information; also, beacons on different levels broadcast different level information.

A parking beacon 31 is composed of a programmable memory attached to a transmitter and to a power source.

Vehicle 15 is equipped with a sensor/signal device that senses events signifying that the user has parked the vehicle. In the preferred embodiment, sensor 16 (FIG. 1B) comprises a photoelectric switch arranged near an interior light of vehicle 15. When the driver's door opens, the interior light turns on, thereby activating the photo-electric switch, and causing sensor 16 to signify that vehicle 15 has been parked. Sensor 16 may be a different type of switch. For example, it may be positioned in vehicle 15 so that the switch would change state upon shifting an automatic transmission from drive into park, applying the parking brake, turning off the engine, removing the keys from the ignition, opening the driver's side door, or any combination of these events.

Upon sensing an appropriate trigger event, sensor 16 prompts activation signal transmitter 18 (FIG. 1B) to wirelessly send an identifiable short-range signal to portable location device 12. It will be understood that only a short range signal is needed to contact portable location device 12 since the user is expected to be in (or near) the vehicle with portable locator device 12 when the car is parked. It will also be understood that a photovoltaic cell or a power supply (not shown) can power the sensor and activation signal transmitter.

The signal sent by activation signal transmitter 18 prompts locator device 12 to detect signals from the nearest parking lot beacons 31. Subsequently, locator device 12 receives information about the parking lot and parking section from beacon 31 and stores it in memory.

On activation of button 22, locator 12 displays the information message indicating the vehicle location.

Figure 1B:
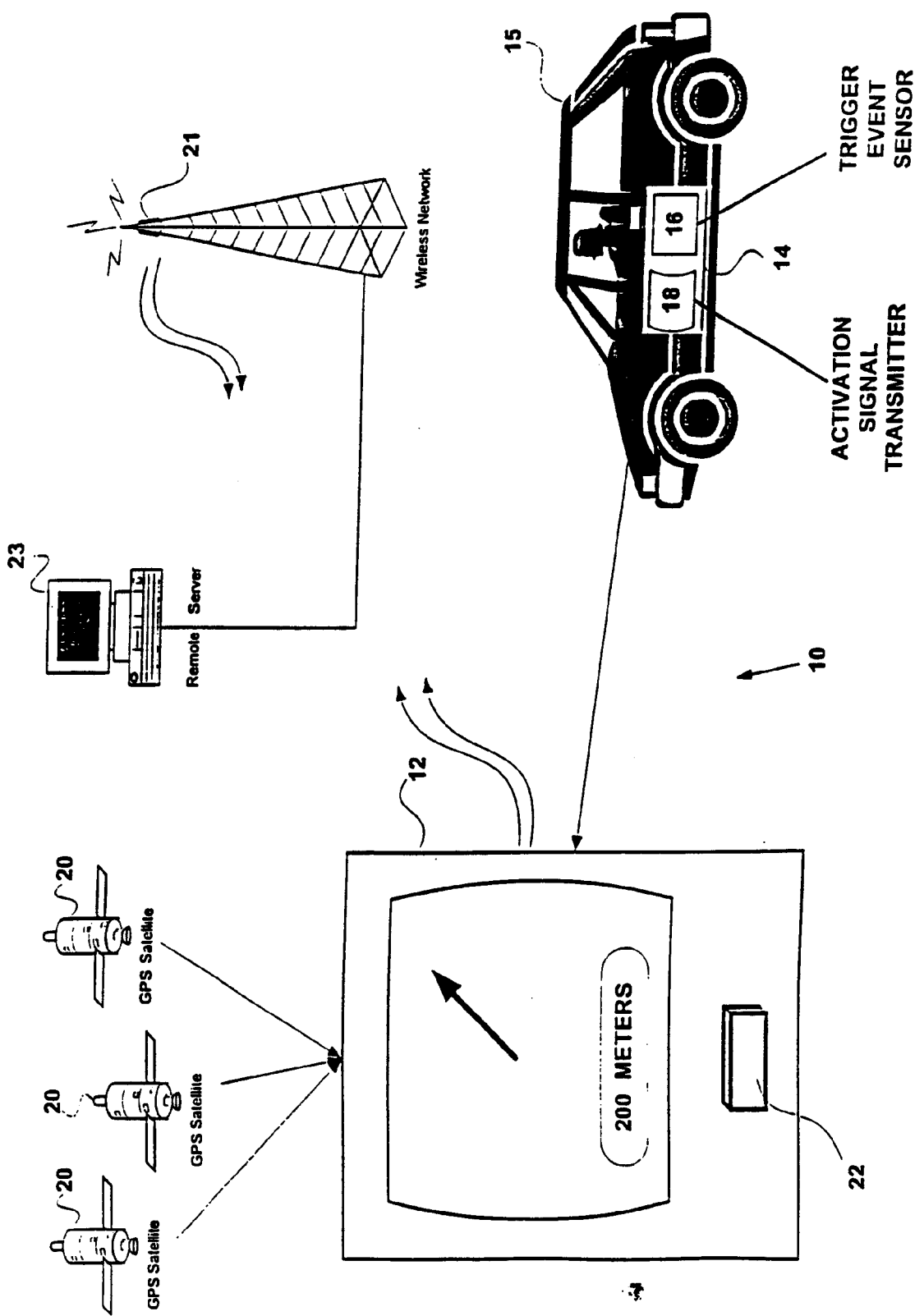
FIG. 1B is another schematic of a parked vehicle locator system.

Referring to FIG. 1B, in another embodiment, parked vehicle sensor/signal device 14 is attached to a user's vehicle 15. Parked vehicle sensor/signal device 14 comprises a trigger event sensor 16 interconnected with an activation signal transmitter 18.

Parked vehicle locator 12 may be a stand-alone device such as a compact hand held unit. Alternatively, locator device 12 may be incorporated with another portable electronic device such as a cellular phone, personal communication device, personal data assistant, pager or portable personal computer.

The signals sent by activation signal transmitter 18 prompt locator device 12 to detect signals from parking lot beacon 31 (FIG. 1A). If there is no parking lot beacon in the vicinity, locator device 12 cooperates with GPS 20 to determine the vehicle's current GPS location and stores this information for future reference. It will be understood that GPS 20 may alternatively be a GLONASS, LORAN, GNSS, or any other commercially available service, or combination of services, that provide global position information.

Locator 12 may also cooperate with other location systems such as cellular base stations, or a triangulation network to determine position information.

The activation of button 22 corresponds of the event of the user searching for its vehicle. Locator 12 displays directions to finding the parked vehicle. Locator 12 displays a textual message indicating where the vehicle is parked, for example, parking lot address and GPS coordinates, level, section . . . or a pointer and distance to the vehicle location.

Figure 2A:
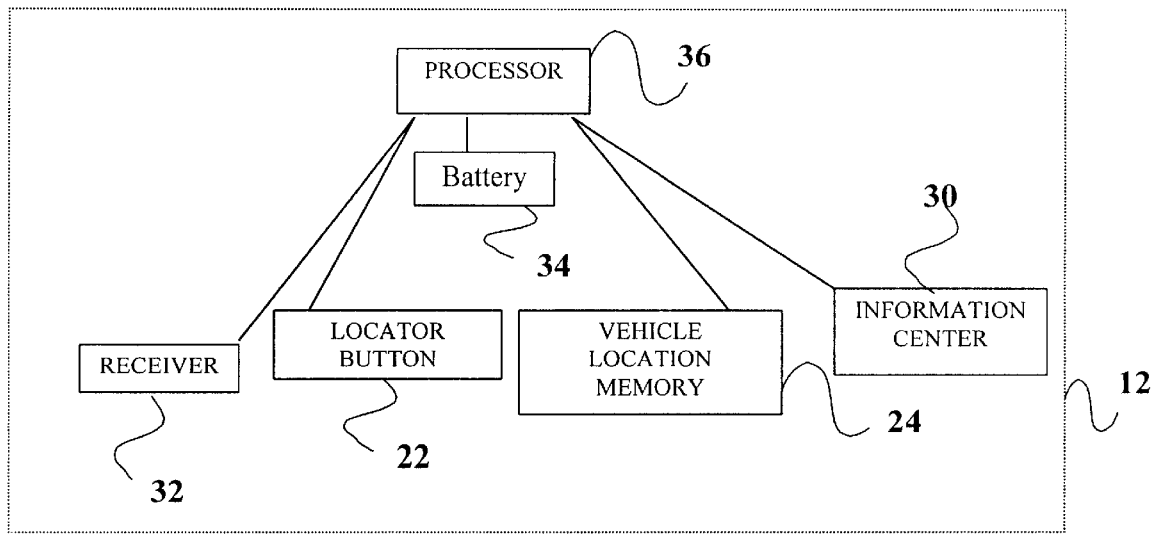
FIG. 2A is a block diagram of a portable locator made in accordance with this invention.
Figure 2:
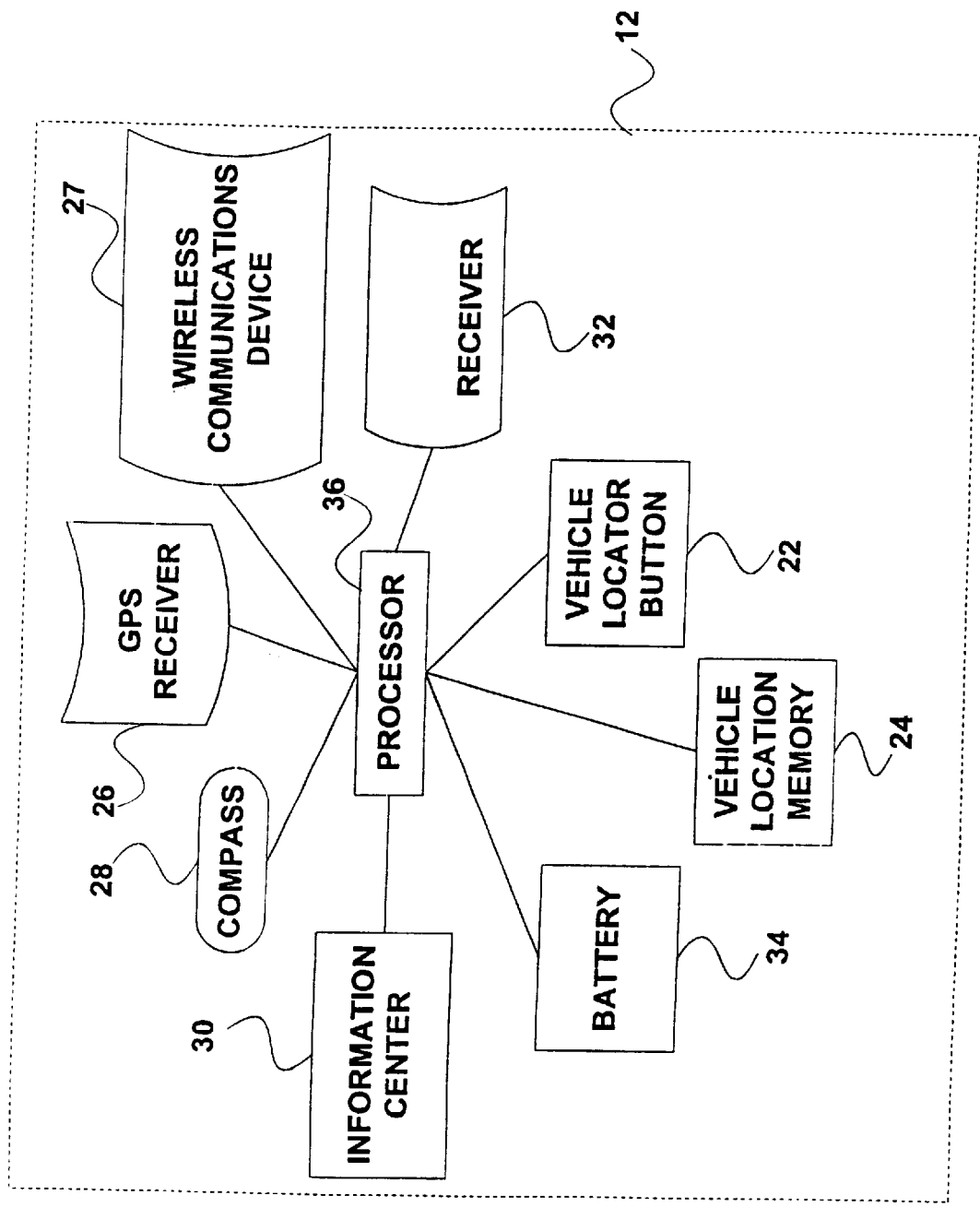
FIG. 2B is a block diagram of another portable locator made in accordance with this invention.

Referring now to FIG. 2A, in one embodiment, portable locator device 12 comprises a processor 36 interconnected with several components. Such components comprise a vehicle locator button 22, memory 24, a receiver 32, an information center 30 and a battery 34.

Receiver 32 awaits activation signals from activation signal transmitter 18 (FIG. 1B). It will be understood that receiver 32 may be any type of receiver capable of receiving the signals generated by activation signal transmitter 18 or beacon 31. Receiver 32 may be a radio frequency (RF), ultrasound, Bluetooth or any other type of receiver.

Upon receipt of an activation signal through receiver 32, locator 12 (FIG. 1B) detects the nearest parking beacon 31, collects parking information from beacon 31 through receiver 32, and stores the information in memory 24.

When portable locator device 12 is not in operation it remains in dormant state ("sleep-mode") to conserve the energy of battery 34. When button 22 is pressed, information center 30 displays the vehicle parking information.

Information center 30 conveys bearing and distance information to the user. Information center 30 is preferably a liquid crystal display ("LCD") capable of displaying a digital pointer and alphanumeric readout of distance, as shown in FIGS. 1A, 1B. However, information center 30 may also be a cathode ray tube, a plasma discharge display, a compact speaker or any other audible or visual means capable of conveying information to the user.

Battery 34 provides power to some of the components of portable location device 12. It will be understood that battery 34 may be nickel-cadmium, lithium, alkaline or nickel-hydride battery or any other portable source of electric power. Using photovoltaic cells can also generate power.

Referring to FIG. 2B, GPS receiver 26 cooperates with publicly available GPS 20 (FIG. 1B) to determine the user's current location. Wireless communication device 27 is optional and may be used to communicate with wireless network 21 (FIG. 1B) to obtain DGPS correction data. DGPS data is used to improve the accuracy of GPS data. The DGPS service may be available from a satellite, a radio station, a cellular network or any other wireless network. In addition, wireless communication device 27 may access remote server 23 through wireless network 21 to store information and to determine relative bearing and distance. This allows reducing the hardware requirements of locator 12. Wireless communication device 27 may be a cellular phone, a personal communication device or any system capable of accessing the wireless networks mentioned above.

Compass 28 determines the user's current heading.

As described hereafter, processor 36 communicates with the components of locator 12 and determines relative bearing and distance to a stored location by comparing the current location and heading with the stored location. However, remote server 23 may alternatively perform the function of determining relative bearing and distance.

Figure 3:
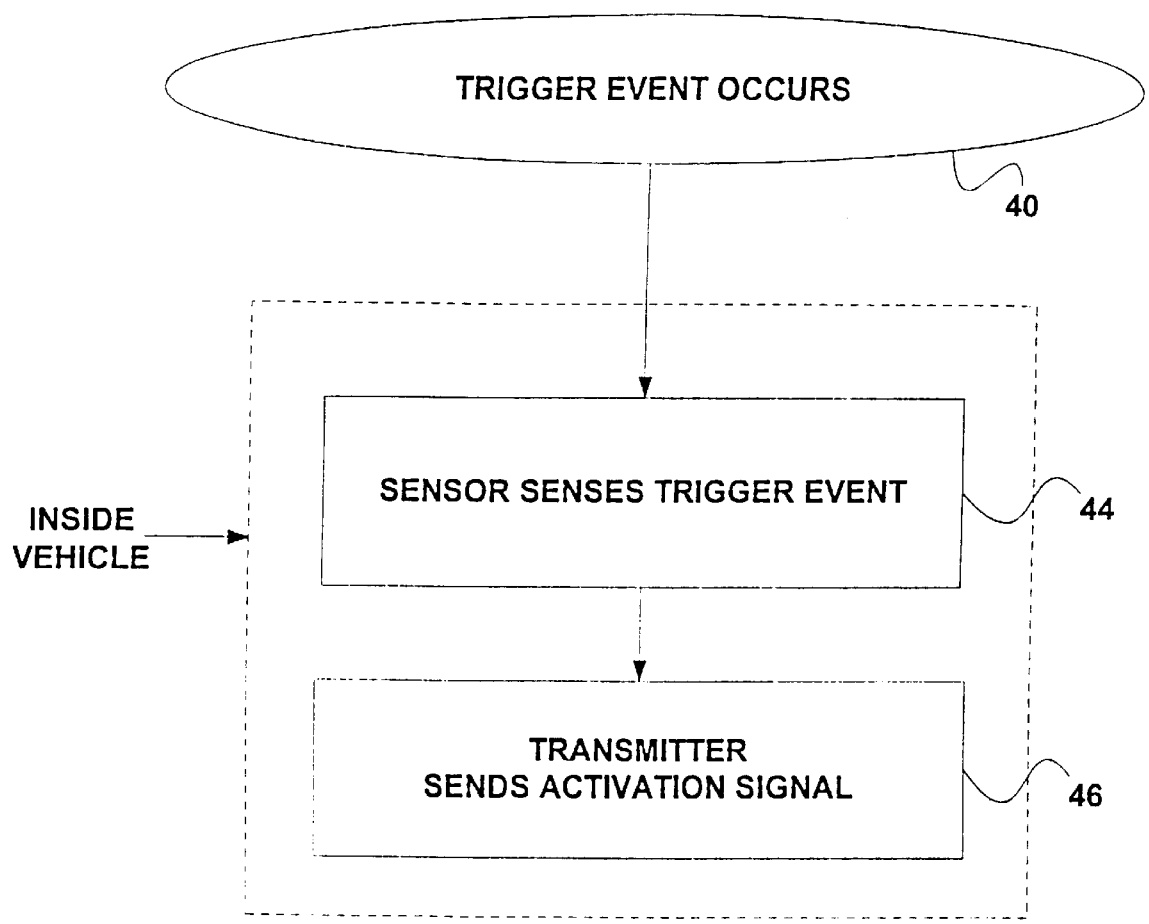
FIG. 3 is a flowchart illustrating the steps involved in sending a signal to a portable locator.

Turning now to FIG. 3, which illustrates the operation of sensor/signal device 14, along with FIGS. 1A and 1B, in step 44 a trigger event 40 (e.g. the illumination of the vehicle's interior light) is sensed by trigger event sensor 16 (FIG. 1B). In step 46, trigger event sensor 16 prompts activation signal transmitter 18 (FIG. 1B) to send a short-range radio frequency signal. The signal indicates that the vehicle was parked.

Figure 4A:
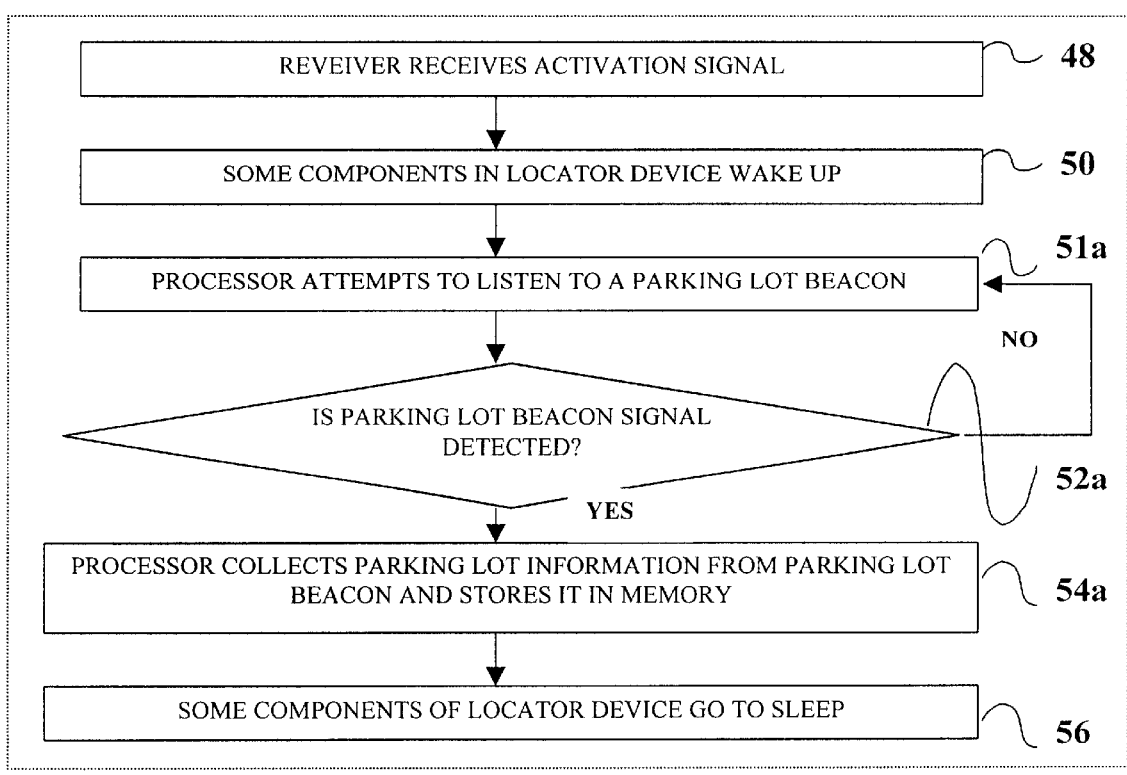
FIG. 4A is a flowchart illustrating the steps involved in storing a vehicle location.

Turning now to FIG. 4A, which illustrates the operation of portable locator 12, upon receipt of the activation signal in step 48, activation signal receiver 32 prompts some components in portable locator 12 to wake up in step 50. After waking up, in step 51a, processor 36 verifies the signal (e.g. checks a digital sequence modulation on the carrier wave with a stored sequence). Next, in step 52a, processor 36 tries to detect a parking lot beacon 31 in the vicinity. A parking lot beacon signal carries a message describing the section where the vehicle is parked, level, parking lot address and GPS coordinates as well as other relevant information such as special directions, best stairway to use . . . . If processor 36 is unable to find a parking lot beacon, it repeats step 51. After a set number of failed attempts (not shown) locator 12 may warn the user with a signal signifying that it was unable to obtain current location. In step 54a the processor saves the received beacon message in vehicle location memory 24 after which, in step 56, some of the components of portable locator 12 return to sleep-mode to conserve energy.

Figure 4B:
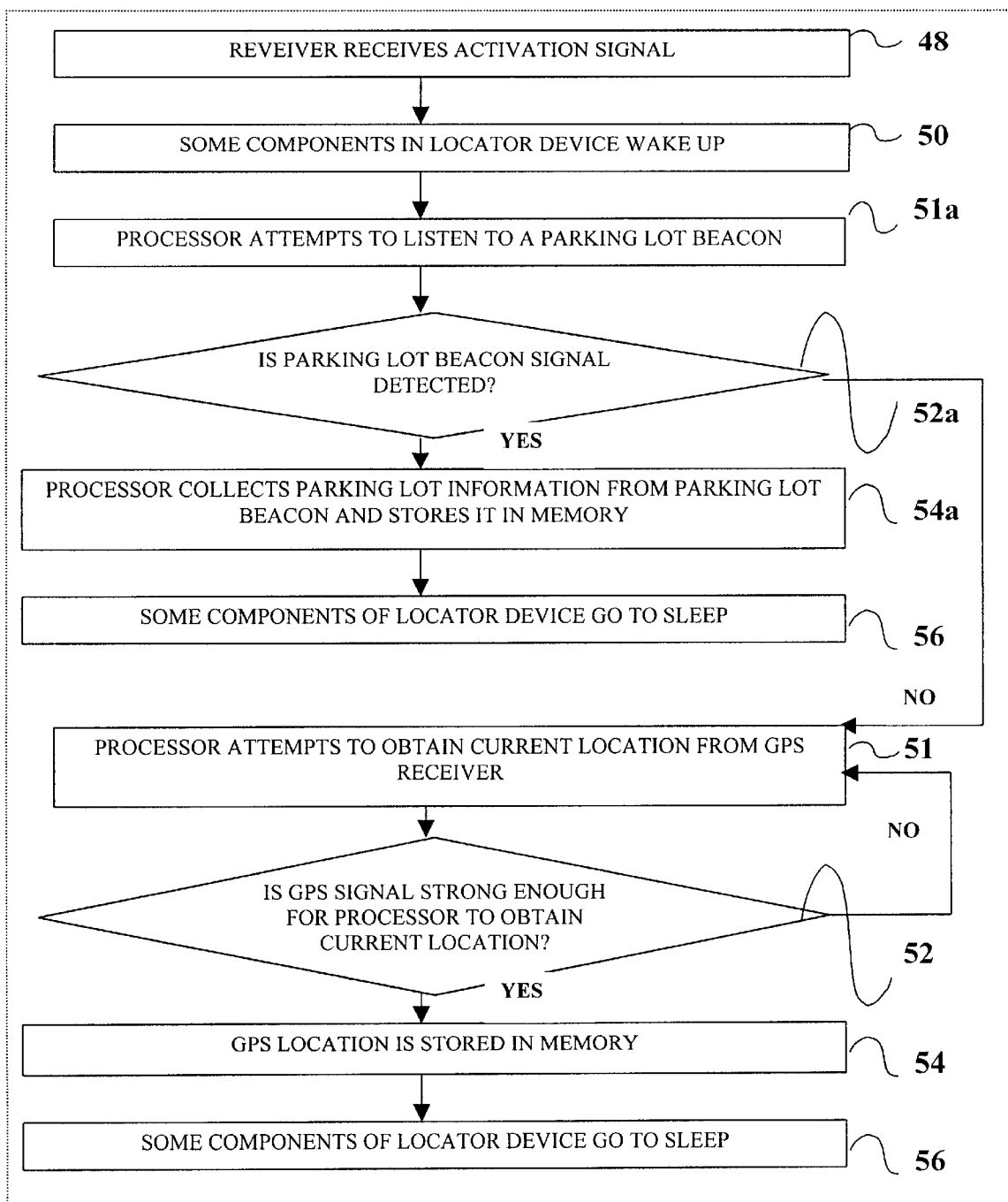
FIG. 4B is a flowchart illustrating alternative steps involved in storing a parked vehicle location.

FIG. 4B, illustrates the operation of portable locator 12 equipped with a GPS receiver. Upon receipt of the activation signal in step 48, activation signal receiver 32 prompts some components in portable locator 12 to wake up in step 50. After waking up, in step 51a, processor 36 verifies the signal (e.g. checks a digital sequence modulation on the carrier wave with a stored sequence). Next, in step 52a, processor 36 tries to detect the nearest parking lot beacon 31 in the vicinity. If processor 36 detects a parking lot beacon in step 54a, processor 36 saves the received beacon message in vehicle location memory 24, after which, in step 56, some of the components of portable locator 12 return to sleep-mode. If processor 36 does not detect a parking lot beacon, in step 51, it attempts to obtain current location from a GPS receiver. Because portable locator 12 must be in or near the vehicle when the vehicle is parked, this position will correspond to the parked vehicle location. However, sometimes the GPS signal is blocked by buildings or is too weak for GPS receiver 26 to obtain. If processor 36 is unable to obtain a current location in step 52, it repeats step 51. After a set number of failed attempts (not shown) locator 12 may warn the user with a signal signifying that it was unable to determine the current location. In step 54 the portable locator's current location is stored in vehicle location memory 24 after which, in step 56, some of the components of portable locator 12 return to sleep-mode.

Figure 5A:
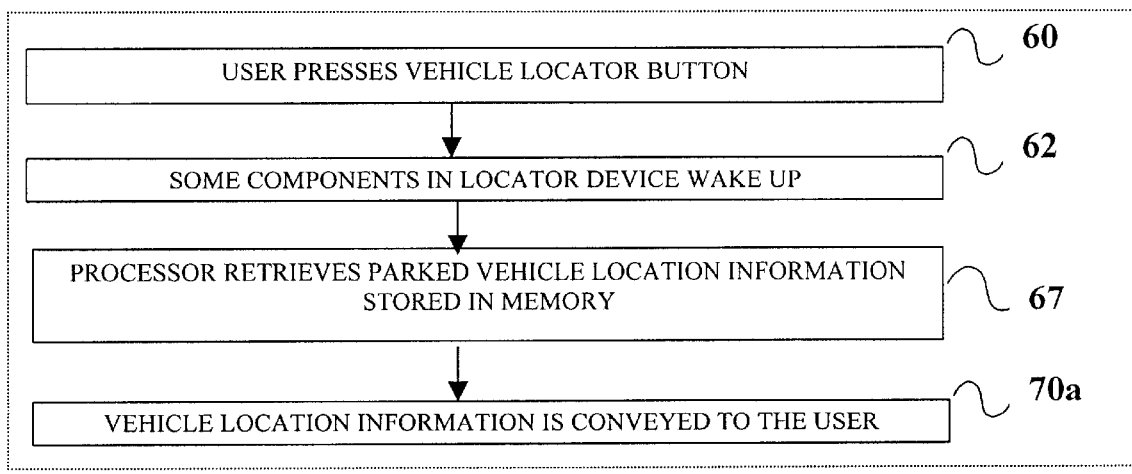
FIG. 5A is a flowchart illustrating the steps involved in conveying parked vehicle location information to a user.

FIG. 5A illustrates a flow chart of the steps involved in locator 12 conveying parked vehicle location directions to a user. Referring to FIGS. 1A, 1B, 2A and 2B, in step 60, a user presses vehicle locator button 22, which prompts some components in portable vehicle locator 12 to wake up in step 62. In step 67, processor 36 retrieves the parked vehicle location message stored in memory 24. In step 70 the location message is conveyed to the user through information center 30.

FIG. 5B illustrates a flow chart of the steps involved in locator 12 equipped with a GPS receiver 26 and compass 28 conveying parked vehicle location directions to a user. Referring to FIGS. 1A, 1B, 2A and 2B, in step 60, a user presses vehicle locator button 22, which prompts some components in portable vehicle locator 12 to wake up in step 62. Upon waking up, in step 66, processor 36 obtains the locator's current heading from compass 28. In step 64 processor 36 attempts to obtain the users current location by accessing GPS 20. Processor 36 may prompt wireless communication device 27 to access a DGPS service to obtain DGPS correction data. If processor 36 is able to obtain a current location in step 52 from GPS receiver 26, it retrieves the parked vehicle location stored in memory 24 in step 67. The location retrieved can be a GPS location previously stored or a parking lot beacon message containing the GPS coordinates of the parking lot (and not the vehicle GPS position). In step 68 processor 36 determines the relative distance and bearing to the user's parked vehicle by comparing the current location and heading with the parked vehicle location stored in vehicle location memory 22. The location stored in memory 24 may be the parking lot location, which can be assimilated with the vehicle location if the user of the vehicle locator is a long distance away from the vehicle. In step 70 the relative distance and bearing information are conveyed to the user through information center 30. If the GPS position retrieved from memory 24 references the vehicle' GPS location, the user can be guided to the vehicle location by pressing the locator button 22 multiple times. Each time locator button 22 is pressed, the new user location and direction are obtained. The bearing and distance to the parked vehicle are recalculated using the new user heading and position information. If the GPS position retrieved from memory 24 references the parking lot, the user will be guided to the parking lot, and will be prompted to read a message that describes the location of the vehicle within the parking lot. In step 52, if the GPS signal is not strong for processor 36 to obtain the current location, processor 36 retrieves the location information stored in memory in step 67a and analyzes it in step 52b. If the location message comes from a parking lot beacon, processor 36 displays the location message to the user in step 70a, otherwise, a message is displayed indicating that the locator cannot read the current GPS signals.

Numerous other modifications, variations, and adaptations may be made to the particular embodiment of the invention described above without departing from the scope of the invention, which is defined in the claims.

ADVANTAGES OF THE CURRENT SYSTEM

1—Works in outdoors and indoors parking lots

2—Works on street parking

3—Can be sold as a stand-alone system, i.e. key chain.

4—Reliable

5—Can be integrated in a cellular phone. Cellular phones are expected to be equipped with location determination devices to comply with FCC rule E911. The current system can use the parking lot beacons when the cellular phone is in a parking lot equipped with parking lot beacons, and use the cellular phone location determination system when there is no parking lot beacon around. Parking lot beacons are useful because most location determination systems fail to function properly in harsh environments such as underground parking lots.

6—Cost effective:

Parking lot beacons have a simple design, and are easy and cheap to build and operate.

The vehicle sensor/transmitter is also cheap to manufacture and easy to install.

The locator can be manufactured in big quantities and sold as a stand-alone.

The locator can be integrated as part of a cellular phone. Since the locator uses many systems already present in cellular phones, the incremental cost of providing the locator functionality in a cellular phone is very little.

What is claimed is:

1. A method for facilitating returning to a parked vehicle location, comprising:

responsive to receiving a wireless activation signal, detecting the presence of a wireless transmitter;

obtaining location data from said wireless transmitter; and storing said location data.

2. The method of claim 1 further comprising:

wirelessly sending said activation signal.

3. The method of claim 2 further comprising:

sensing that a vehicle has been parked;

and wherein the step of wirelessly sending said activation signal occurs in response to said sensing.

4. The method of claim 3 comprising:

if said wireless transmitter is not detected, wirelessly accessing a location service, obtaining position information of a current location from said location service.

5. The method of claim 4 further comprising obtaining position correction data by wirelessly accessing a global location correction service and refining said position information with said position correction data.

6. The method of claim 5 wherein said step of refining said current location is performed by a remote server.

7. The method of claim 3 wherein said sensing comprises sensing a door of a vehicle is opening or an interior light of a vehicle turning on when a door is opened.

8. The method of claim 3 wherein said sensing comprises sensing an engine of said vehicle has been shut down or a key turned off or removed.

9. The method of claim 3 wherein said sensing comprises sensing a parking brake of said vehicle has been engaged or an automatic transmission of said vehicle being switched into park.

10. The method of claim 3 including, upon receiving a user request, retrieving location data from memory and conveying it to the user.

11. The method of claim 4 including, upon receiving a user request, obtaining current location and heading, retrieving stored location data from memory, comparing current location and heading with retrieved location, and conveying to said user a bearing and distance to said stored location.

12. The method of claim 11 comprising:

accessing a remote server for said comparing a current location and heading with said retrieved location.

13. The method of claim 11 wherein said conveying comprises providing a pointer indicating a direction to a location represented by said stored location.

14. Apparatus for facilitating finding a parked vehicle, comprising:

a signaler arranged for signaling to indicate a vehicle has been parked; and, a plurality of transmitters each transmitting location data about its location, a locator responsive to said signaler for detecting nearest transmitter, obtaining location data from said nearest transmitter and storing said location data in memory upon receiving a signal from said signaler.

15. The apparatus of claim 14 wherein said locator has a sleep mode and wherein said locator enters said sleep mode after storing location data in response to said signaler.

16. The apparatus of claim 15 wherein said signaler comprises a switch and generates said signal when said switch switches.

17. The apparatus of claim 16 wherein said signaler further comprises a transmitter for transmitting said signal wirelessly.

18. The apparatus of claim 17 further comprising:

an information center, and an input for sending a user request, wherein, upon receiving a user request, said information center displays said location data.

19. The apparatus of claim 18 wherein said locator comprises a wireless receiver for communication with a positioning service.

20. The apparatus of claim 19 wherein said wireless receiver comprises a GPS receiver.

21. The apparatus of claim 20 wherein said locator further comprises a wireless communication device arranged for obtaining GPS location correction data.

22. The apparatus of claim 20 wherein said locator further comprises a compass for determining a current heading.

23. The apparatus of claim 22 further comprising:

a processor, for determining a relative bearing and distance to a location represented by said stored location, in communication with said wireless receiver and said compass.

24. A method for facilitating returning to a parked vehicle location, comprising:

partitioning a parking lot in sections, putting a transmitter in each section, each transmitter broadcasts directions for returning to said section over the area of said section.

25. The method of claim 24 wherein:

responsive to receiving an activation signal, detecting and obtaining information from said transmitter.

26. The method of claim 25 comprising storing said information.

27. The method of claim 26 wherein said activation signal is triggered by sensing that a vehicle has been parked.

28. The method of claim 26 wherein:

said activation signal is a wireless activation signal.

* * * * *